United States Patent
Andersson et al.

(10) Patent No.: US 12,279,301 B2
(45) Date of Patent: Apr. 15, 2025

(54) RESOLVING COLLISION OF SEMI-PERSISTENT SCHEDULING DATA

(71) Applicant: Telefonaktiebolaget LM Ericsson (PUBL), Stockholm (SE)

(72) Inventors: Mattias Andersson, Sundbyberg (SE); Yufei Blankenship, Kildeer, IL (US); Kittipong Kittichokechai, Järfälla (SE); Ali Behravan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 348 days.

(21) Appl. No.: 17/781,771

(22) PCT Filed: Dec. 7, 2020

(86) PCT No.: PCT/IB2020/061586
§ 371 (c)(1),
(2) Date: Jun. 2, 2022

(87) PCT Pub. No.: WO2021/111424
PCT Pub. Date: Jun. 10, 2021

(65) Prior Publication Data
US 2023/0021623 A1    Jan. 26, 2023

Related U.S. Application Data

(60) Provisional application No. 62/944,168, filed on Dec. 5, 2019.

(51) Int. Cl.
*H04W 72/566*   (2023.01)
*H04L 1/00*   (2006.01)
*H04W 72/23*   (2023.01)

(52) U.S. Cl.
CPC ......... *H04W 72/569* (2023.01); *H04L 1/0045* (2013.01); *H04W 72/23* (2023.01)

(58) Field of Classification Search
CPC ...... H04L 1/0045; H04L 1/18; H04W 72/569; H04W 72/23
See application file for complete search history.

(56) References Cited

U.S. PATENT DOCUMENTS

2013/0242770 A1 * 9/2013 Chen ................. H04L 67/02
370/252
2015/0036566 A1 * 2/2015 Blankenship ....... H04W 52/367
370/311
(Continued)

OTHER PUBLICATIONS

3GPP TSG RAN WG1 Meeting #99; Reno, Nevada (US); Source: Nokia, Nokia Shanghai Bell; Title: IIoT WI: Resource conflicts between UL grants, HARQ-ACK and activation/release aspects for SPS (R1-1912609)—Nov. 18-22, 2019.
(Continued)

*Primary Examiner* — Benjamin H Elliott, IV
(74) *Attorney, Agent, or Firm* — Baker Botts L.L.P.

(57) ABSTRACT

According to some embodiments, a method performed by a wireless device for decoding physical shared channels (PSCHs) comprises, for a plurality of PSCHs in a transmission time interval, determining a first PSCH of the plurality of PSCHs at least partially overlaps in time with a second PSCH of the plurality of PSCHs. Based on comparison of a common characteristic of the first PSCH and the second PSCH, the method comprises selecting one of the first PSCH and the second PSCH to decode and decoding the selected PSCH.

22 Claims, 18 Drawing Sheets

(56) References Cited

U.S. PATENT DOCUMENTS

| | | | | |
|---|---|---|---|---|
| 2019/0173612 A1* | 6/2019 | Kimura | ................ | H04L 1/0063 |
| 2021/0153237 A1* | 5/2021 | Saber | .................... | H04W 72/23 |
| 2021/0391956 A1* | 12/2021 | Gou | ..................... | H04L 1/1896 |
| 2022/0123874 A1* | 4/2022 | Choi | ................ | H04W 72/1273 |
| 2023/0021623 A1* | 1/2023 | Andersson | ............ | H04W 72/23 |

OTHER PUBLICATIONS

3GPP TSG RAN WG1 #99; Reno, USA; Source; LG Electronics; Title: Summary #2 of 7.2.6.7 Others (R1-1913451)—Nov. 18-22, 2019.

3GPP TSG-RAN WG2 #105bis; Xi'an, China; Source: Ericsson; Title: DL SPS configuration (Tdoc R2-1904048)—Apr. 8-12, 2019.

PCT International Search Report issued for International application No. PCT/IB2020/061586—Feb. 25, 2021.

PCT Written Opinion of the International Searching Authority issued for International application No. PCT/IB2020/061586—Feb. 25, 2021.

European Patent Office, Communication pursuant to Article 94(3) EPC, Examination Report in Application No. 20 824 346.9-1206 dated Jul. 2, 2024.

* cited by examiner

RESOLVING COLLISION OF SEMI-PERSISTENT SCHEDULING DATA

PRIORITY

This nonprovisional application is a U.S. National Stage Filing under 35 U.S.C. § 371 of International Patent Application Serial No. PCT/IB2020/061586 filed Dec. 7, 2020 and entitled "RESOLVING COLLISION OF SEMI-PERSISTENT SCHEDULING DATA" which claims priority to U.S. Provisional Patent Application No. 62/944,168 filed Dec. 5, 2019 both of which are hereby incorporated by reference in their entirety.

TECHNICAL FIELD

Embodiments of the present disclosure are directed to wireless communications and, more particularly, to resolving collision of semi-persistent scheduling (SPS) data.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The next generation (NG) mobile wireless communication system (5G) or new radio (NR) supports a diverse set of use cases and a diverse set of deployment scenarios. NR uses cyclic prefix orthogonal frequency division multiplexing (CP-OFDM) in the downlink (i.e., from a network node, gNB, eNB, or base station, to a user equipment (UE)) and both CP-OFDM and discrete Fourier transform (DFT)-spread OFDM (DFT-S-OFDM) in the uplink (i.e., from UE to gNB). In the time domain, NR downlink and uplink physical resources are organized into equally-sized subframes of 1 ms each. A subframe is further divided into multiple slots of equal duration.

The slot length depends on subcarrier spacing. A subcarrier spacing of $\Delta f=15$ kHz includes only one slot per subframe and each slot consists of 14 OFDM symbols.

NR typically schedules data transmission on a per slot basis. An example is illustrated in FIG. 1.

FIG. 1 illustrates the NR time-domain structure with 15 kHz subcarrier spacing. The horizontal axis represents the time domain. The first two symbols contain physical downlink control channel (PDCCH) and the remaining 12 symbols contain a physical data channel (PDCH), either a physical downlink data channel (PDSCH) or physical uplink data channel (PUSCH).

NR supports different subcarrier spacing values. The supported subcarrier spacing values (also referred to as different numerologies) are given by $\Delta f=(15 \times 2^\alpha)$ kHz where $\alpha$ is a non-negative integer. $\Delta f=15$ kHz is the basic subcarrier spacing that is also used in long term evolution (LTE). The slot durations at different subcarrier spacings are shown in Table 1.

TABLE 1

Slot length at different numerologies

| Numerology | Slot length | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

In the frequency domain physical resource definition, a system bandwidth is divided into resource blocks (RBs), where each RB corresponds to 12 contiguous subcarriers. The common RBs (CRB) are numbered starting with 0 from one end of the system bandwidth.

The UE is configured with one or up to four bandwidth part (BWPs) which may be a subset of the RBs supported on a carrier. Thus, a BWP may start at a CRB larger than zero. All configured BWPs have a common reference, the CRB 0. Accordingly, a UE can be configured a narrow BWP (e.g. 10 MHz) and a wide BWP (e.g. 100 MHz), but only one BWP can be active for the UE at a given point in time. The physical RB (PRB) are numbered from 0 to N-1 within a BWP (but the $0^{th}$ PRB may thus be the $K^{th}$ CRB where K>0). An example is illustrated in FIG. 2.

FIG. 2 illustrates the NR physical time-frequency resource grid. The horizontal axis represents time and the vertical axis represents frequency. Only one resource block (RB) within a 14-symbol slot is illustrated. One OFDM subcarrier during one OFDM symbol interval forms one resource element (RE).

Downlink transmissions can be dynamically scheduled, i.e., in each slot the gNB transmits downlink control information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. A UE first detects and decodes PDCCH and if the decoding is successful, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

PDSCH resource allocation in the time domain is performed as follows. When the UE is scheduled to receive PDSCH by a DCI, the time domain resource assignment (TDRA) field value m of the DCI provides a row index m+1 to an allocation table. The determination of the used resource allocation table is defined in sub-clause 5.1.2.1.1 of 3GPP TS38.214 v15.6.0, where either a default PDSCH time domain allocation A, B or C according to tables 5.1.2.1.1-2, 5.1.2.1.1-3, 5.1.2.1.1.-4 and 5.1.2.1.1-5 is applied, or the higher layer configured parameter pdsch-TimeDomainAllocationList in either pdsch-ConfigCommon or pdsch-Config is applied.

For a DCI with cyclic redundancy check (CRC) scrambled by cell radio network temporary identifier (C-RNTI), modulation and coding scheme (MCS)-C-RNTI, configured scheduling (CS)-RNTI, the applicable TDRA is shown in Table 2.

TABLE 2

Applicable PDSCH time domain resource allocation

| RNTI | PDCCH search space | pdsch-ConfigCommon includes pdsch-TimeDomain AllocationList | pdsch-Config includes pdsch-TimeDomain AllocationList | PDSCH time domain resource allocation to apply |
|---|---|---|---|---|
| C-RNTI, MCS-C-RNTI, CS-RNTI | Any common search space associated with CORESET 0 | No | — | Default A |
| | | Yes | — | pdsch-TimeDomainAllocationList provided in pdsch-ConfigCommon |
| C-RNTI, MCS-C-RNTI, CS-RNTI | Any common search space not associated with CORESET 0 UE specific search space | No | No | Default A |
| | | Yes | No | pdsch-TimeDomainAllocationList provided in pdsch-ConfigCommon |
| | | No/Yes | Yes | pdsch-TimeDomainAllocationList provided inpdsch-Config |

The default PDSCH time domain resource allocation A for normal CP is shown in Table 3, where the indexed row defines directly the slot offset K0, the start symbol S within the slot and the PDSCH allocation length L in symbols, and the PDSCH mapping type to be assumed in the PDSCH reception. Either Type A (i.e., slot based PDSCH transmission) or Type B (i.e., mini-slot based PDSCH transmission) may be indicated.

TABLE 3

Default PDSCH time domain resource allocation A for normal CP
(Table 5.1.2.1.1-2 of 3GPP TS38.214 v15.6.0)

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

When pdsch-TimeDomainAllocationList is configured, the pdsch-TimeDomainAllocationList contains a list of PDSCH-time domain resource allocation information elements (IEs) as shown below, where the start symbol S and the allocation length L are jointly encoded in startSymbolAndLength as the start and length indicator (SLIV).

```
PDSCH-TimeDomainResourceAllocation ::= SEQUENCE {
    k0                    INTEGER(0..32)
    mappingType           ENUMERATED {typeA, typeB},
    startSymbolAndLength  INTEGER (0..127)
}
```

The valid S and L values are shown in Table 4 below for PDSCH mapping type A and type B.

TABLE 4

Valid S and L combinations (Table 5.1.2.1-1 of 3gpp TS38.214 v15.6.0)

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Position = 3

For Type A PDSCH, the TDRAs in the pdsch-TimeDomainAllocationList or in the default table A shown in Table 3 are partially overlapping and only one PDSCH can be scheduled in a slot per serving cell in NR Release 15.

For Type B PDSCH, some of the TDRAs in the pdsch-TimeDomainAllocationList or in the default table A may be non-overlapping because the start position of the PDSCH can be more flexibly chosen, and thus more than one PDSCH may be scheduled in a slot. FIG. 3 illustrates some examples.

FIG. 3 illustrates examples of Type A and Type B PDSCH. Type A PDSCH is illustrated by configurations (a) and (b). Type B PSDCH is illustrated by configurations (c) and (d).

Configuration (a) includes PDCCH in symbols 0 and 1, and PDSCH in symbols 2-13. Configuration (b) includes PDCCH in symbols 0 and 1, and PDSCH in symbols 2-5. Thus, configurations (a) and (b) includes overlapping TDRAs, as illustrated.

Configuration (c) includes PDCCH in symbols 0 and 1, and PDSCH in symbols 4-7. Configuration (d) includes two type B PDSCHs scheduled in the slot. Configuration (d) includes PDCCH1 in symbols 0 and 1 with corresponding PDSCH1 in symbols 2-5, and PDCCH2 in symbols 7 and 8 with corresponding PDSCH2 in symbols 9 and 10. Thus, configurations (c) and (d) include both overlapping and non-overlapping TDRAs, as illustrated.

NR includes ultra-reliable and low latency communication (URLLC) services as a key feature of 5G. These are services for latency sensitive devices for applications like factory automation, electric power distribution, and remote driving. These services have strict reliability and latency requirements, e.g., at least 99.999% reliability within 1 ms one-way latency.

In NR downlink, the PDSCH can be scheduled with either dynamic assignments or by using downlink SPS (semi-persistent scheduling). For dynamic assignments, the gNB provides a downlink assignment to the UE for each downlink transmission (i.e., PDSCH).

For downlink SPS, some of the transmission parameters (i.e., those indicated by DCI in dynamic scheduling) are pre-configured using radio resource control (RRC) signaling from the network to the UE, while the remainder of the transmission parameters L1 signaled via a single DCI during the SPS activation. In the following slots, there is no DCI transmitted, thus the UE uses the RRC and SPS activation parameters to perform the PDSCH reception in multiple downlink slots. That is, some of the transmission parameters are semi-statically configured via RRC, and the remaining transmission parameters are provided by a DCI which activates the downlink SPS process. To stop such downlink SPS transmission, a "release" is indicated to the UE from the network. The scheduling release (also called deactivation) of the downlink SPS process is signaled by the gNB to the UE, using a new DCI.

In Rel-15, the SPS-Config IE is used to configure downlink semi-persistent transmission by RRC. The periodicity of the transmission, the number of hybrid automatic repeat request (HARQ) processes and the PUCCH resource identifier as well as the possibility to configure an alternative MCS table can be configured by RRC signaling. Downlink SPS may be configured on the SpCell as well as on SCells, but it may not be configured for more than one serving cell of a cell group at once.

| SPS-Config information element |
|---|
| -- ASN1START |
| -- TAG-SPS-CONFIG-START |
| SPS-Config ::=    SEQUENCE { |
|   periodicity    ENUMERATED {ms10, ms20, ms32, ms40, |
| ms64, ms80, ms128, ms160, ms320, ms640, |
|     spare6, spare5, spare4, |
| spare3, spare2, spare1}, |
|   nrofHARQ-Processes    INTEGER (1..8), |
|   n1PUCCH-AN    PUCCH-ResourceId |
| OPTIONAL,  -- Need M |
|   mcs-Table    ENUMERATED {qam64LowSE} |
| OPTIONAL,  -- Need S |
|   ... |
| } |
| -- TAG-SPS-CONFIG-STOP |
| -- ASN1STOP |

Industrial Internet of Things (IIoT) may have up to 8 downlink SPS configurations simultaneously configured on a bandwidth part (BWP) of a serving cell. Separate configuration, separate activation, separate release (also joint release), for different downlink SPS configurations are supported for a given BWP of a serving cell. One reason, for example, is that different IIoT services may have different periodicity and potentially need different MCS tables.

A collision between two or more downlink SPS PDSCHs may be handled as follows. In case of collision only between more than one SPS PDSCHs each without a corresponding PDCCH, a UE is not required to decode SPS PDSCHs other than the SPS PDSCH with the lowest SPS configuration index among collided SPS PDSCHs. The UE shall report HARQ-ACK feedback only for the SPS PDSCH with the lowest SPS configuration index among collided SPS PDSCHs. In other words, if more than one PDSCH on a serving cell each without a corresponding PDCCH transmission are partially or fully overlapping in time, a UE is not required to decode a PDSCH among these PDSCHs other than one with the lowest configured sps-ConfigIndex.

There currently exist certain challenges. For example, prior solutions do not adequately resolve the various collision scenarios involving downlink SPS PDSCH. As one example, FIG. 4 illustrates a scenario with more than one downlink SPS PDSCH in a slot. Specifically, FIG. 4 illustrates decoding according to current working assumption, where SPS config #B is not decoded even though it could be decoded.

In the illustrated example, Config #A overlaps in time with Config #B which overlaps in time with Config #C. Assuming the SPS configurations IDs to be A<B<C, only Config #A is decoded by the UE, or HARQ-ACK feedback is only reported for Config #A. Because Config #A does not overlap with Config #B in time, however, both Config #A and Config #B could be decoded and HARQ-ACK can be recorded for both.

SUMMARY

Based on the description above, certain challenges currently exist with resolving collision of semi-persistent scheduling (SPS) data. Certain aspects of the present disclosure and their embodiments may provide solutions to these or other challenges. For example, particular embodiments resolve collisions involving downlink SPS physical downlink shared channel (PDSCH).

According to some embodiments, a method performed by a wireless device for decoding physical shared channels (PSCHs) (e.g., PDSCH) comprises, for a plurality of PSCHs in a transmission time interval, determining a first PSCH of the plurality of PSCHs at least partially overlaps in time with a second PSCH of the plurality of PSCHs. Based on comparison of a common characteristic of the first PSCH and the second PSCH, the method comprises selecting one of the first PSCH and the second PSCH to decode and decoding the selected PSCH.

In particular embodiments, the method comprises decoding any PSCH of the plurality of PSCHs that does not overlap in time with another PSCH of the plurality of PSCHs.

In particular embodiments, the wireless device is capable of decoding N number of PSDCHs simultaneously and the method further comprises decoding any PSCH of the plurality of PSCHs that does not overlap in time with less than N other PSCH of the plurality of PSCHs.

In particular embodiments, the common characteristic comprises a configuration index of the PSCH and selecting one of the first and second PSCHs to decode comprises selecting the PSCH with a lower configuration index. The common characteristic may comprise a starting time of the PSCH and selecting one of the first and second PSCHs to decode comprises selecting the PSCH with an earliest starting time. The common characteristic may comprise a priority of the PSCH and selecting one of the first and second PSCHs to decode comprises selecting the PSCH with a higher priority. For example, the priority may be based on a priority of a corresponding hybrid automatic repeat request (HARQ) acknowledgement (ACK) associated with the PSCH or a priority of a downlink control information (DCI) activating the PSCH.

In particular embodiments, the plurality of PSCHs comprises more the one PSCH with the same configuration index and the more than one PSCHs with the same configuration index are all selected together.

In particular embodiments, the PSCHs comprise a mix of dynamic grant (DG) and semi-persistent scheduling (SPS) and selecting one of the first and second PSCHs to decode comprises selecting a DG PSCH over a SPS PSCH.

In particular embodiments, the method further comprises transmitting HARQ feedback for the selected PSCH.

According to some embodiments, a wireless device is capable of decoding PSCHs. The wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

Certain embodiments may provide one or more of the following technical advantages. For example, particular embodiments resolve collisions involving downlink SPS PDSCH.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, certain challenges currently exist with resolving collision of semi-persistent scheduling (SPS) data. For example, prior solutions do not adequately resolve the various collision scenarios involving downlink SPS physical downlink shared channel (PDSCH). For example, with more than one downlink SPS PDSCH in a slot, some PDSCH may not be decoded even though they could be decoded.

Certain aspects of the present disclosure and their embodiments may provide solutions to these or other challenges. For example, particular embodiments resolve collisions involving downlink SPS PDSCH.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In a first group of examples, downlink SPS PDSCH collides with downlink SPS PDSCH. These examples assume that the UE is only capable of processing one PDSCH among the overlapping PDSCHs. If the UE is capable of processing more than one PDSCH among overlapping PDSCHs, particular embodiments may be modified to facilitate processing of more overlapping PDSCHs.

Figure 1:
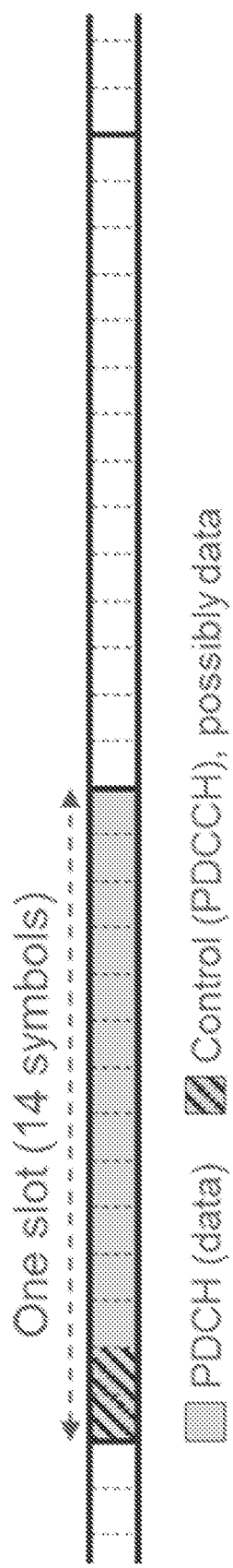
FIG. 1 illustrates the NR time-domain structure with 15 kHz subcarrier spacing.
Figure 2:
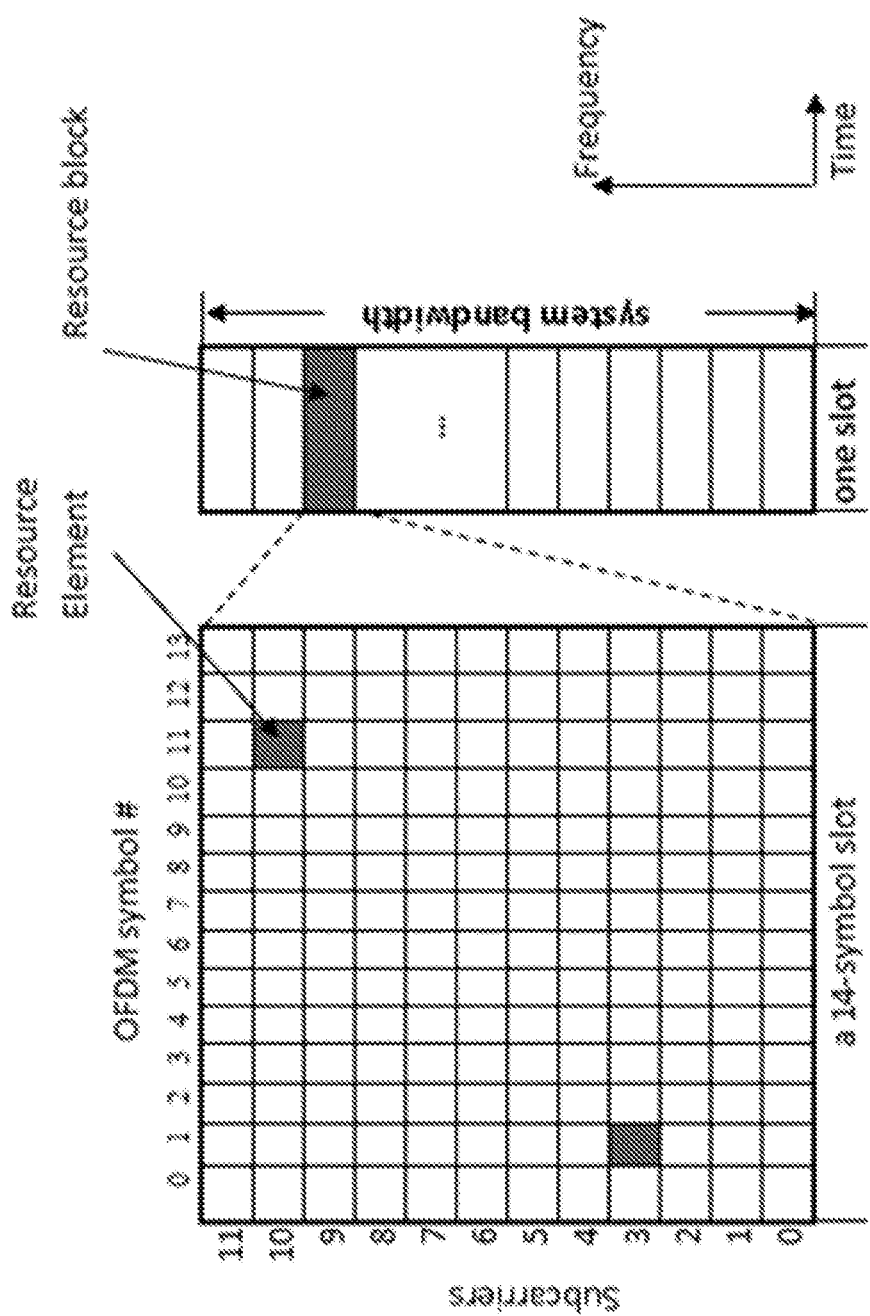
FIG. 2 illustrates the NR physical time-frequency resource grid.
Figure 3:
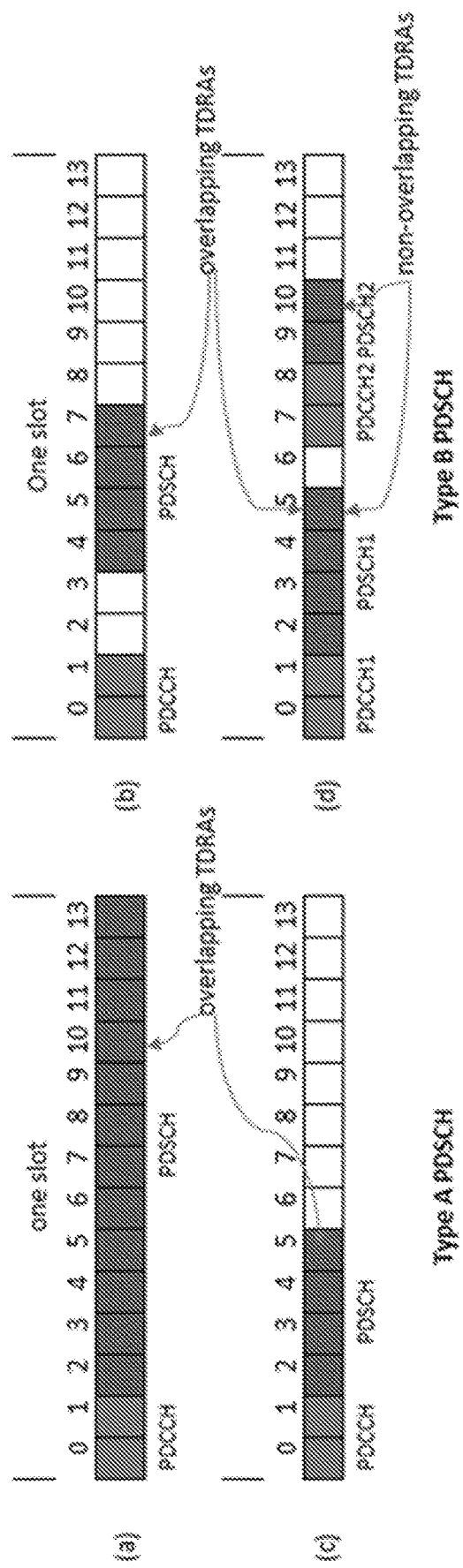
FIG. 3 illustrates examples of Type A and Type B PDSCH.
Figure 4:
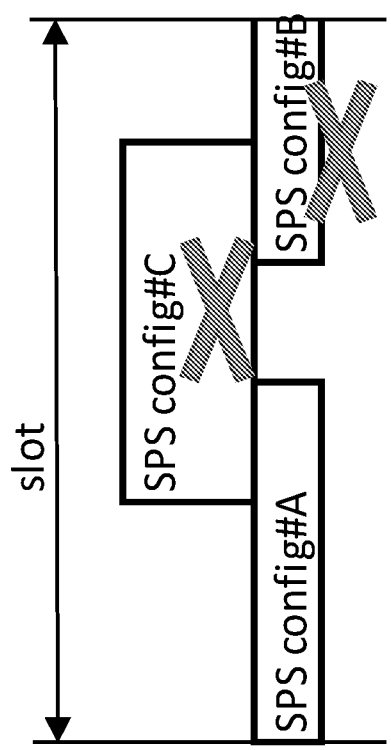
FIG. 4 illustrates a scenario with more than one downlink SPS PDSCH in a slot.

As one example, a downlink SPS PDSCH collides with downlink SPS PDSCH with periodicity>=1 slot always. In some embodiments, the UE is not required to decode a downlink SPS PDSCH that overlaps at least partially in time with a second downlink SPS PDSCH that has a lower configuration index. The UE is expected to decode a downlink SPS PDSCH if the PDSCH does not overlap with any downlink SPS PDSCH with a lower configuration index. This has the advantage that Config #B in the situation in FIG. 4 is decoded together with Config #A, while Config #C is not decoded.

In some embodiments, the UE is not required to decode a second downlink SPS PDSCH that overlaps at least partially in time with a first downlink SPS PDSCH that has a lower configuration index and the UE is required to decode the first downlink SPS PDSCH. On the other hand, the UE is expected to decode the second downlink SPS PDSCH that overlaps at least partially in time with a first downlink SPS PDSCH that has a lower configuration index and the UE is not required to decode the first downlink SPS PDSCH. In one version of this embodiment, the UE recursively determines whether it is required to decode the first downlink SPS PDSCH using this embodiment again. For example, the UE may apply the condition recursively by checking whether the second downlink SPS PDSCH overlaps at least partially in time with any downlink SPS PDSCHs with lower configuration indices and which the UE is required to decode.

In some embodiments, the UE determines which downlink SPS PDSCHs it needs to decode in an iterative manner, and by method of elimination. The UE starts from SPS PDSCH with lowest index and if there is any SPS PDSCH that overlaps with it then the overlapping SPS PDSCH is dropped. The procedure is repeated for the next SPS PDSCH with the second lowest index available and remove any SPS PDSCH that overlaps with it. The procedure continues until the highest downlink SPS index is reached. An example configuration is illustrated in FIG. 5.

Figure 5:
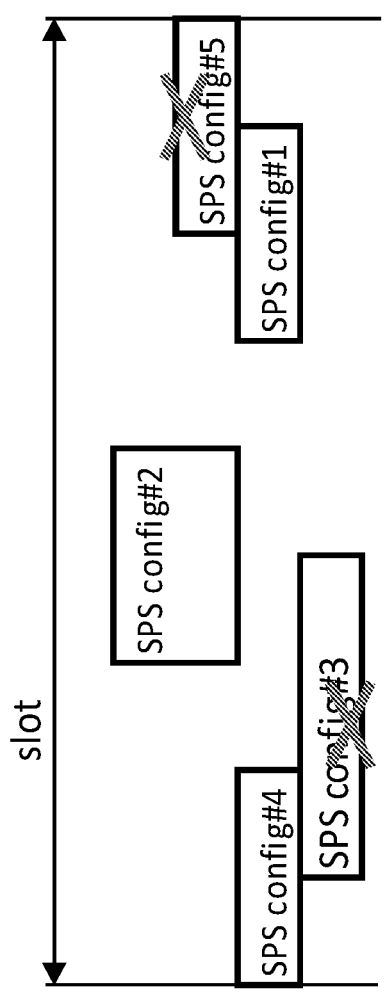
FIG. 5 illustrates a slot with two sets of overlapped downlink SPS PDSCHs.

FIG. 5 illustrates a slot with two sets of overlapped downlink SPS PDSCHs. SPS config #3 overlaps with both SPS config #4 and SPS config #2, and SPS config #1 overlaps with SPS config #5. Applying the above described method to the example illustrated in FIG. 5, the procedure starts from SPS config #1, and anything that overlaps with it is dropped, i.e., SPS config #5 is not decoded. In the next iteration, any SPS PDSCH that overlaps with SPS config #2 is dropped, i.e., SPS config #3. Finally, for SPS config #4 there is no overlapping SPS configuration and therefore it can also be decoded by the UE.

The iterative procedure can be described as follows.

Step 1. For a given time interval $TTI_0$, identify the size-K set $S_0$ of transmissions, $D_k$, that need collision resolution $S_0=\{D_1, D_2, \ldots D_K\}$. Initialize the set $S_1$ to $S_0$, $S_1=S_0$. Initialize set P to a null set.

Step 2. In Set $S_1$, identify the transmission $D_j$ as a transmission to process (i.e., not dropped). Transmission $D_j$ is kept (i.e., not dropped) by applying a given criterion among all transmissions in set $S_1$.

Step 3. In Set $S_1$, remove all transmissions that overlap in time with $D_j$. Add $D_j$ to the set P.

Step 4. If no more collision exists in set $S_1$, terminate the procedure. The set $S_1$ contains the transmissions to be processed (i.e., not dropped). Otherwise, go to Step 5.

Step 5. Make a set $S_2$, where $S_2$ contains all $D_j$ in set $S_1$, except those $D_j$ in set P.

Step 6. In Set $S_2$, identity the transmission $D_j$ as a transmission to process (i.e., not dropped). Transmission $D_j$ is kept (i.e., not dropped) by applying the given criteria among all transmissions in set $S_2$.

Step 7. In Set $S_1$, remove all transmissions that overlap in time with $D_j$. Add $D_j$ to the set P.

Step 8. Go back to Step 4.

In the above, the given criteria can be:

Criteria 1. for all downlink SPS in the set, select the PDSCH transmission(s) associated with the downlink SPS configuration with the lowest configuration index.

a. For a downlink SPS configuration with periodicity>=1 slot, only one PDSCH transmission is selected. Otherwise, for a downlink SPS configuration with periodicity<1 slot, two or more PDSCH transmission are selected. For example, if the downlink SPS with the lowest configuration index uses periodicity=7OS, then two of its PDSCH transmissions are selected in a slot.

b. Another criterion to use when there are periodicities<1 slot is to select one of them at a time and perform the steps. Any order in which to select can be used.

Criteria 2. Alternatively, the given criteria can be: for all downlink SPS in the set, select the PDSCH of downlink SPS configuration with the highest priority.

Criteria 3. Alternatively, the given criteria can be: for all downlink SPS in the set, select the PDSCH of downlink SPS configuration that has the earliest starting time.

Criteria 4. Two or more of the above alternatives can be used in combination, for example: for all downlink SPS in the set, select the PDSCH of downlink SPS configuration with the highest priority; if more than one downlink SPS have the same, highest, priority, then select the one with the lowest configuration index among them.

In the above, typically the given time interval $TTI_0$ is a slot in NR, and when any of the transmission $D_j$ is repeated, the procedure is applied to each repetition individually.

The set $S_1$ is used to collect the transmissions that are to be processed (i.e., not dropped). That is, at the end of collision resolution procedure, any transmission $D_k$ that is in $S_0$ but not in $S_1$ is dropped (i.e., not processed by the UE).

As illustrated in FIG. 5, there are two sets of overlapped downlink SPS PDSCHs in a slot. The first set contains downlink SPS PDCSHs with configuration index 2, 3, and 4. Another set contains downlink SP S PDCSHs with configuration index 1 and 5. For the first set, UE can remove downlink SPS PDSCH with index 3 because it partially overlaps with the downlink SPS PDSCH with the lowest index in the set (index 2). After removing, there is no more overlapping downlink SPS PDSCHs in this set. Next, in the second set, the UE can remove downlink SPS PDSCH with index 5 because it partially overlaps with the downlink SPS PDSCH with the lowest index in the set (index 1). After removing there is no more overlapping downlink SPS PDSCHs in this set. The procedure is complete where in this slot the UE is required to decode downlink SPS PDSCHs with index 1, 2, and 4 all of which do not overlap in time.

When applying Step 1-8 in the example, the procedure is as follows.

Step 1. For a given time interval TTI0=1 slot, identify the set S0 of transmissions that need collision resolution S0={D1, D2, . . . D5}, where Dj is the PDSCH of downlink SPS configuration #j. Initialize the set S1 to S0, S1=S0. Initialize set P to a null set.

Step 2. In Set $S_1$, identity the transmission $D_1$ as a transmission to process (i.e., not dropped). Transmission $D_j$ is kept (i.e., not dropped) by applying Criteria 1 among all transmissions {$D_0$, $D_1$, $D_2$, . . . $D_5$} in set $S_1$.

Step 3. In Set $S_1$, remove all transmissions that overlap in time with $D_1$, thus $S_1$={$D_1$, $D_2$, $D_3$, $D_4$} after removing $D_5$. Add $D_1$ to the set P, P={$D_1$}.

Step 4. Because there are still collisions that exist in set S1, go to Step 5.

Step 5. Make a set S2, where S2 contains all Dj in set S1, except those Dj in set P. That is, S2={D2, D3, D4}

Step 6. In Set S2, identity the transmission D2 as a transmission to process (i.e., not dropped). Transmission D2 is kept (i.e., not dropped) by applying the Criteria 1 among all transmissions in set S2.

Step 7. In Set S1, remove all transmissions that overlap in time with D2, thus S1={D1, D2, D4} after removing D3. Add D2 to the set P, P={D1, D2}.

Step 8. Because no more collision exists in Set S1, terminate the procedure. The set S1={D1, D2, D4} contains the transmissions to be processed (i.e., not dropped). Transmissions {D3, D5} are dropped (i.e., the UE is not expected to process them).

In some embodiments, the UE determines which downlink SPS PDSCHs it needs to decode in an iterative manner. First it checks whether there is any overlap between downlink SPS PDSCHs within a certain time period, e.g. a slot. If there is a set of overlapping downlink SPS PDSCHs, the UE may remove the downlink SPS PDSCHs in the set with the highest configuration index. This procedure can be continued until there are no downlink SPS PDSCHs which overlap anymore. Then the UE decodes the remaining downlink SPS PDSCHs in the set.

In some versions of the embodiments described here, the UE can use other steps before or after to further remove downlink SPS PDSCHs from the set of downlink SPS PDSCHs to decode.

In some embodiments, the UE processing time for reporting HARQ-ACK is increased by an offset. The offset may vary depending on the number of downlink SPS PDSCHs which are overlapped in a set, the offset may vary depending on the number of removed downlink SPS PDSCHs in a set with overlapped PDSCHs, and/or the offset may be fixed in a specification.

As another example, a downlink SPS PDSCH collides with downlink SPS PDSCH, with periodicity<1 slot allowed. When SPS periodicity<1 slot is allowed, there can be more than one PDSCHs of a same downlink SPS configuration in a slot. Thus, particular embodiments revise the collision resolution methods to account for the multiple PDSCHs of a same SPS configuration index. For example, Step 2 is revised to Step 2', and Step 6 is revised to Step 6':

Step 2' In Set S1, identity the set of transmission(s) {$D_i$, . . . , $D_j$} to process (i.e., not dropped). Transmission(s) {$D_i$, . . . , $D_j$} are kept (i.e., not dropped) by applying a given criterion among all transmissions in set S1.

Step 6' In Set $S_2$, identity the set of transmission(s) {$D_i$, . . . , $D_j$} to process (i.e., not dropped). Transmission(s) {$D_i$, . . . , $D_j$} are kept (i.e., not dropped) by applying the given criteria among all transmissions in set $S_2$. An example is illustrated in FIG. 6.

Figure 6:
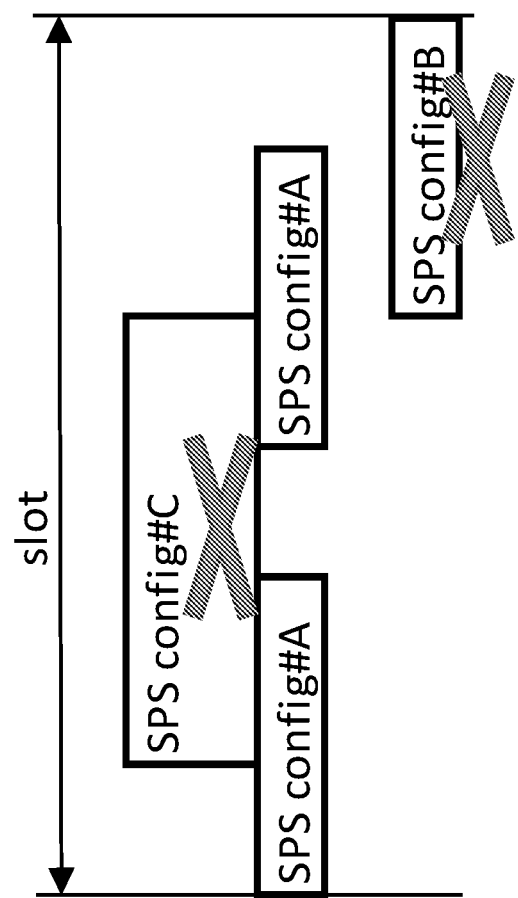
FIG. 6 illustrates a collision among downlink SPS configurations, where one of the SPS configurations has a periodicity of less than one slot.

FIG. 6 illustrates a collision among downlink SPS configurations, where one of the SPS configurations has a periodicity of less than one slot. In the illustrated example, SPS Config #A has periodicity of less than one slot.

Using the criteria that the PDSCH(s) of the lowest SPS configuration index among the set of colliding PDSCHs is kept, 'A', 'B', 'C' refer to configuration index, and A<B<C, then the two PDSCH of configuration #A are kept, while PDSCHs of configuration #B and #C are dropped.

Each PDSCH may be treated individually in the collision resolution procedure, i.e., if one PDSCH of SPS configuration #X is dropped, another PDSCH of SPS configuration #X may or may not be dropped depending on its individual collision situation. An example is illustrated in FIG. 7.

Figure 7:
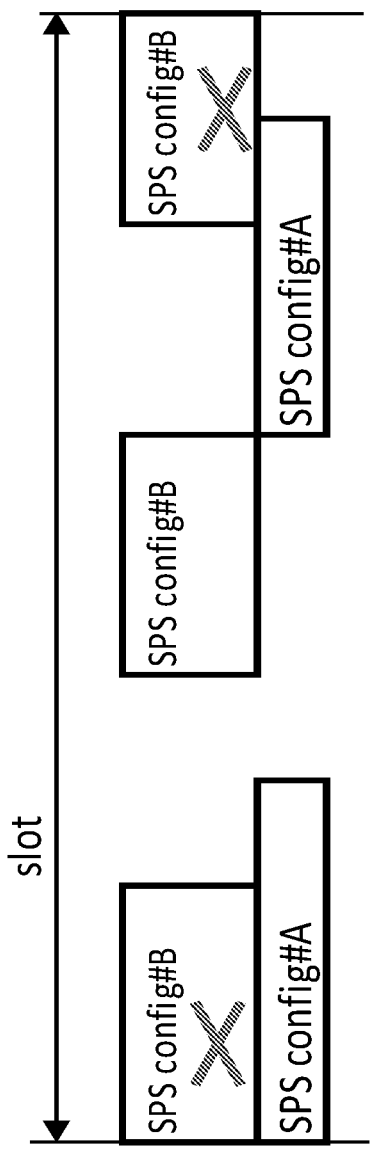
FIG. 7 illustrates a collision among downlink SPS configurations, where two of the SPS configurations have a periodicity of less than one slot.

FIG. 7 illustrates a collision among downlink SPS configurations, where two of the SPS configurations have a periodicity of less than one slot. In the illustrated example, SPS configuration #A has periodicity less than one slot, the first and third PDSCH of SPS configuration #B are dropped by the UE due to collision with configuration #A, and the second PDSCH of SPS configuration #B is kept.

Although particular embodiments and/or examples are described herein for downlink semi-persistent transmission, the same methodology can be applied to uplink semi-persistent transmission (i.e., uplink configured grant). For example, the uplink configured grant (CG) transmission can use the steps 1-8 together with a variation of criteria 2, where the priority of the logical channel(s) mapped to the uplink CG is applied to keep the higher priority transmission.

In a second group of examples, downlink SPS PDSCH collides with dynamic grant (DG) PDSCH. In some embodiments, the priority of the overlapping DG PDSCH and downlink SPS PDSCH(s) are compared. The higher priority PDSCH is kept while the lower priority PDSCH is dropped, if PDSCHs of different priority level collides. If PDSCHs of the same priority level collides, then the DG PDSCH is prioritized and processed, while the SPS PDSCH(s) is dropped.

In some embodiments, the priority of downlink SPS PDSCH is determined from the RRC configured priority of its corresponding HARQ-ACK, or determined from a priority indication field in the activation DCI activating downlink SPS PDSCH. In some embodiments, the DG PDSCH is processed and the downlink SPS is dropped, regardless of the priority of downlink SPS.

In some embodiments, the collision resolution is performed in the following steps:

Step A1: Resolve collision between dynamic PDSCH transmissions to result in the first set of PDSCHs in the given slot.

Step B1. Resolve collision between SPS PDSCH transmissions to result in the second set of PDSCHs in the given slot. The methods described for resolving collision among SPS-only PDSCHs are applied.

Step C1: Resolve collision between the first and second set of PDSCHs in the given slot. One option is to prioritize the first set of PDSCHs over any PDSCH in the second set, if collision exists. Another option is to prioritize the second set of PDSCHs over any PDSCH in the first set, if collision exists.

In another embodiment, the collision resolution is performed in the following steps:

Step A2: Resolve collision between PDSCH transmissions of higher priority to result in the first set of PDSCHs in the given slot. The PDSCHs may be dynamically scheduled or SPS scheduled.

Step B2. Resolve collision between SPS PDSCH transmissions of lower priority to result in the second set of PDSCHs in the given slot. The PDSCHs may be dynamically scheduled or SPS scheduled.

Step C2: Resolve collision between the first and second set of PDSCHs in the given slot. Prioritize the first set of PDSCHs over any PDSCH in the second set, if collision exists.

A third group of examples includes collision resolution when a UE is capable of processing two or more overlapping PDSCHs. For example, a UE may be capable of processing N PDSCHs among the overlapped downlink SPS PDSCHs. The UE determines which downlink SPS PDSCHs it needs to decode in an iterative manner. First it checks whether there is any overlap between downlink SPS PDSCHs within a certain time period, e.g. a slot. If there is a set of overlapped downlink SPS PDSCHs, the UE can remove one or more downlink SPS PDSCHs with highest configuration indices until the number of (overlapped) downlink SPS PDSCH in the set is not more than N. This procedure can be continued for all sets containing overlapped downlink SPS PDSCHs. Then the UE decodes the remaining downlink SPS PDSCHs. An example is illustrated in FIG. 8.

Figure 8:
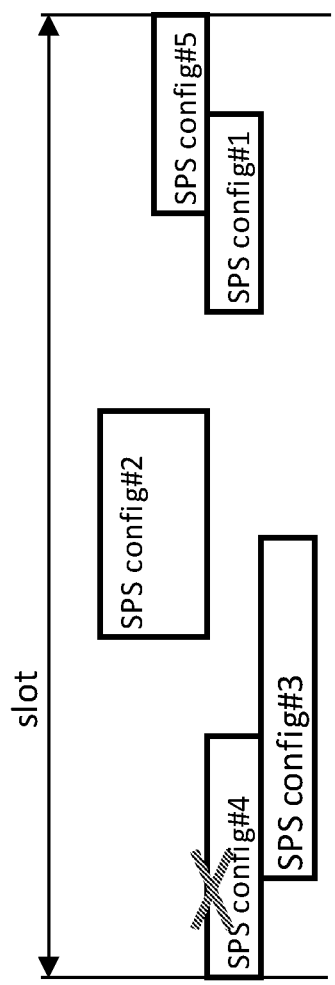
FIG. 8 illustrates collision among downlink SPS configurations where the wireless device is capable of processing two PDSCH simultaneously.

FIG. 8 illustrates collision among downlink SPS configurations where the wireless device is capable of processing two PDSCH simultaneously. The illustrated example includes two sets of overlapping downlink SPS PDSCHs in a slot. The first set contains downlink SPS PDCSHs with configuration index 2, 3, and 4. Another set contains downlink SPS PDCSHs with configuration index 1 and 5.

For the first set, the UE can remove downlink SPS PDSCH with index 4 which is the highest index in the set. It can keep downlink SPS PDSCH index 3 (the next highest index) because it is capable of processing two PDCSHs among the overlapped PDSCHs. Next, in the second set, the UE does not remove any downlink SPS PDSCH because it is capable of processing two PDCSHs among the overlapped PDSCHs. The procedure is complete where in this slot the UE is required to decode downlink SPS PDSCHs with index 1, 2, 3, and 5 where there are at most 2 PDSCHs among the overlapping PDSCHs.

In some embodiments, the UE determines which downlink SPS PDSCHs it needs to decode in an iterative manner, and by method of elimination. Assume that the UE is capable of processing two overlapping SPS PDSCHs, although the method is applicable to processing more than two overlapping SPS PDSCHs. The UE starts from SPS PDSCH with lowest index and if there is more than one SPS PDSCH that overlaps with it, then only the two SPS PDSCH with the lowest index among all of them is kept and any downlink SPS that overlaps with any one of the resolved ones, and has higher configuration index is dropped. Then the procedure is repeated for the SPS PDSCH with the next lowest index available and if there is more than one SPS PDSCH overlaps with it, only the two SPS PDSCH with the lowest ID among them are kept and any downlink SPS that overlaps with any one of the resolved ones are dropped. The procedure continues until the highest downlink SPS index.

Applying this method on the example of FIG. 8, the procedure starts from SPS config #1, and because SPS config #5 overlaps with it and there is no other SPS PDSCH overlapping with any one of them then both are processed. Then, the procedure continues with SPS config #2, and because only SPS config #3 overlaps with it, then both of them are kept. Finally, because SPS config #4 overlaps with an already resolved SPS configuration, and has higher configuration ID than both of the resolved one then it is dropped.

Figure 9:
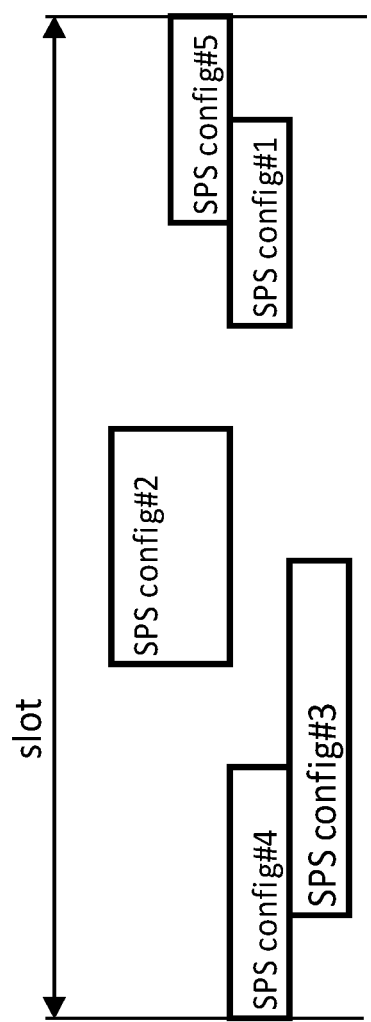

In some embodiments, the UE is not required to decode a downlink SPS PDSCH if it overlaps with N downlink SPS PDSCHs with lower configuration indices in the same symbol. Using this embodiment in the example illustrated in FIG. 9, all SPS configurations are kept.

In some embodiments, each downlink SPS PDSCH is associated with one of N labels. The N labels may be associated with different processing chains, for example. The N labels can correspond to different priorities, or to different processing time requirements. The above embodiments can be changed to only allow keeping one downlink SPS PDSCH with each label, for example the overlapping one with the lowest configuration index.

Another variation of the above set of embodiments is to apply any of the embodiments in the first or second group of examples to all downlink SPS PDSCHs associated with each label separately. This ensures that no downlink SPS PDSCH overlaps in time with another downlink SPS PDSCH associated with the same label.

For example, if there are two labels, L1 and L2, any of the above embodiments may be applied to all downlink SPS PDSCHs associated with label L1. This ensures that no downlink SPS PDSCH associated with label L1 overlaps with another downlink SPS PDSCH associated with label L1. Then the same embodiment may be applied to the downlink SPS PDSCHs associated with label L2, ensuring that no downlink SPS PDSCH associated with label L2 overlaps with another downlink SPS PDSCH associated with label L2.

Some embodiments include HARQ-ACK generation when collision of downlink SPS PDSCHs exist. For example, the embodiments and examples described above may lead to potentially more than one downlink SPS PDSCH in a slot being processed by the UE.

When a downlink SPS PDSCH collides with downlink SPS PDSCH, with periodicity>=1 slot always, then the following HARQ-ACK generation applies for cases where (a) the UE is only capable of processing one PDSCH when two or more PDSCH (dynamic PDSCH or SPS PDSCH) collides in time, and (b) the UE is capable of processing N PDSCHs when two or more PDSCH (dynamic PDSCH or SPS PDSCH) collides in time.

In case of collision only between more than one SPS PDSCHs each without a corresponding PDCCH, a UE is not required to decode SPS PDSCHs that are dropped in the collision resolution procedure. The UE shall report HARQ-ACK feedback for all the SPS PDSCH in the slot that are kept for UE processing.

If the UE is configured with more than one SPS PDSCH configurations, for cases where only HARQ-ACK feedback for one or more SPS PDSCH receptions without a corresponding PDCCH shall be reported (i.e., no HARQ-ACK feedback for dynamic scheduled PDSCH and/or for SPS PDSCH release), then the HARQ-ACK bit order for SPS PDSCH reception without a corresponding PDCCH is determined in ascending order of downlink slot per {SPS configuration index, serving cell index}, and then in ascending order of SPS configuration index per {serving cell index}, and then in ascending order of serving cell index.

If the UE is configured with more than one SPS PDSCH configuration, and for type-1 HARQ-ACK codebook construction, for cases where HARQ-ACK feedback for one or more SPS PDSCH receptions without a corresponding PDCCH is multiplexed with HARQ-ACK feedback for dynamic scheduled PDSCH and/or for SPS PDSCH release, or for cases where HARQ-ACK feedback for SPS PDSCH release is multiplexed with HARQ-ACK feedback for dynamic scheduled PDSCH, or for cases where only HARQ-ACK feedback for SPS PDSCH release shall be reported, the HARQ-ACK bit location for SPS PDSCH reception is derived by reusing Rel-15 mechanism (i.e., based on the TDRA table row index and K1 indicated in the activation DCI). The HARQ-ACK bit location for SPS PDSCH release with a separate release DCI is derived by reusing Rel-15 mechanism (i.e., based on the TDRA table row index indicated in the activation DCI and K1 indicated in the release DCI). The HARQ-ACK bit location for SPS PDSCH release with a joint release DCI is derived based on the TDRA table row index indicated in the activation DCI for SPS PDSCH with the lowest SPS configuration index among the jointly released configurations and K1 indicated in the release DCI.

If the UE is configured with more than one SPS PDSCH configurations, and for type-2 HARQ-ACK codebook construction, the HARQ-ACK bit order for SPS PDSCH release with a separate/joint release DCI is derived by reusing Rel-15 mechanism (i.e., based on DAI and K1 indicated in the release DCI). The HARQ-ACK bit order for SPS PDSCH with associated PDCCH is derived by reusing rel-15 mechanism (i.e., based on DAI and K1 indicated in the activation DCI).

For cases where HARQ-ACK feedback for one or more SPS PDSCH receptions without a corresponding PDCCH is multiplexed with HARQ-ACK feedback for dynamic scheduled PDSCH and/or for SPS PDSCH release, the HARQ-ACK for one or more SPS PDSCH receptions without a corresponding PDCCH is appended after HARQ-ACK bits for dynamic scheduled PDSCHs and/or for SPS PDSCH release. The order may be in ascending order of downlink slot per {SPS configuration index, serving cell index}, and then in ascending order of SPS configuration index per {serving cell index}, and then in ascending order of serving cell index.

When a downlink SPS PDSCH collide with downlink SPS PDSCH, with periodicity<1 slot is allowed, then there can be more than one PDSCH of a same downlink SPS configuration in a slot. When reporting HARQ-ACK bit(s) for the M PDSCHs of a same downlink SPS configuration in a slot, two options are possible.

Option 1 is to separately report the HARQ-ACK bit for each of the M PDSCHs of the same SPS configuration. Option 2 is to jointly report the HARQ-ACK bit for each of the M PDSCHs of the same SPS configuration. For example, produce a single HARQ-ACK bit to respond to the M PDSCHs, by applying an AND function to the individual HARQ-ACK bit for each PDSCH. Thus, the joint HARQ-ACK bit='ACK' only when all individual HARQ-ACK bits are equal to 'ACK'. Otherwise, as long as one of the individual HARQ-ACK bit is equal to 'NACK', the joint HARQ-ACK bit='NACK'.

The following HARQ-ACK generation applies for both cases:

(a) The UE is only capable of processing one PDSCH when two or more PDSCH (dynamic PDSCH or SPS PDSCH) collides in time;

(b) The UE is capable of processing N PDSCHs when two or more PDSCH (dynamic PDSCH or SPS PDSCH) collides in time;

In case of collision only between more than one SPS PDSCHs each without a corresponding PDCCH, a UE is not required to decode SPS PDSCHs that are dropped in the collision resolution procedure. The UE shall report HARQ-ACK feedback for all the SPS PDSCH in the slot that are kept for UE processing.

If the UE is configured with more than one SPS PDSCH configurations, for cases where only HARQ-ACK feedback for one or more SPS PDSCH receptions without a corresponding PDCCH shall be reported (i.e. no HARQ-ACK feedback for dynamic scheduled PDSCH and/or for SPS PDSCH release)

HARQ-ACK bit order for SPS PDSCH reception without a corresponding PDCCH is determined according to the following. If using Option 1 above, the order is in ascending order of PDSCH transmission time per {SPS configuration index, serving cell index}, and then in ascending order of SPS configuration index per {serving cell index}, and then in ascending order of serving cell index.

Alternatively, if using Option 2 above: then generate one joint HARQ-ACK bit for all the PDSCHs in a slot for a same SPS configuration index if multiple PDSCHs of a same SPS configuration exist in a lot. Then arrange the HARQ-ACK bits in ascending order of downlink slot per {SPS configuration index, serving cell index}, and then in ascending order of SPS configuration index per {serving cell index}, and then in ascending order of serving cell index If the UE is configured with more than one SPS PDSCH configuration, and for type-1 HARQ-ACK codebook construction, for cases where HARQ-ACK feedback for one or more SPS PDSCH receptions without a corresponding PDCCH is multiplexed with HARQ-ACK feedback for dynamic scheduled PDSCH and/or for SPS PDSCH release, or for cases where HARQ-ACK feedback for SPS PDSCH release is multiplexed with HARQ-ACK feedback for dynamic scheduled PDSCH, or for cases where only HARQ-ACK feedback for SPS PDSCH release shall be reported, for SPS PDSCH reception, apply Option 2 above. That is, generate one joint HARQ-ACK bit for all the PDSCHs in a slot for a same SPS configuration index if multiple PDSCHs of a same SPS configuration exist in a lot. Then HARQ-ACK bit location is derived by reusing Rel-15 mechanism (i.e., based on the TDRA table row index and K1 indicated in the activation DCI).

The HARQ-ACK bit location for SPS PDSCH release with a separate release DCI is derived by reusing Rel-15 mechanism (i.e., based on the TDRA table row index indicated in the activation DCI and K1 indicated in the release DCI). The HARQ-ACK bit location for SPS PDSCH release with a joint release DCI is derived based on the TDRA table row index indicated in the activation DCI for SPS PDSCH with the lowest SPS configuration index among the jointly released configurations and K1 indicated in the release DCI.

If the UE is configured with more than one SPS PDSCH configuration, and for type-2 HARQ-ACK codebook construction, the HARQ-ACK bit order for SPS PDSCH release with a separate/joint release DCI is derived by reusing Rel-15 mechanism (i.e., based on DAI and K1 indicated in the release DCI). The HARQ-ACK bit order for SPS PDSCH with associated PDCCH is derived by reusing rel-15 mechanism (i.e., based on DAI and K1 indicated in the activation DCI).

For cases where HARQ-ACK feedback for one or more SPS PDSCH receptions without a corresponding PDCCH is multiplexed with HARQ-ACK feedback for dynamic scheduled PDSCH and/or for SPS PDSCH release, the HARQ-ACK for one or more SPS PDSCH receptions without a corresponding PDCCH is appended after HARQ-ACK bits for dynamic scheduled PDSCHs and/or for SPS PDSCH release.

The HARQ-ACK bit order for SPS PDSCH reception without a corresponding PDCCH is determined, If using Option 1 above, in ascending order of PDSCH transmission time per {SPS configuration index, serving cell index}, and then in ascending order of SPS configuration index per {serving cell index}, and then in ascending order of serving cell index. Alternatively, if using Option 2 above, generate one joint HARQ-ACK bit for all the PDSCHs in a slot for a same SPS configuration index if multiple PDSCHs of a same SPS configuration exist in a lot. Then arrange the HARQ-ACK bits in ascending order of downlink slot per {SPS configuration index, serving cell index}, and then in ascending order of SPS configuration index per {serving cell index}, and then in ascending order of serving cell index.

Figure 10:
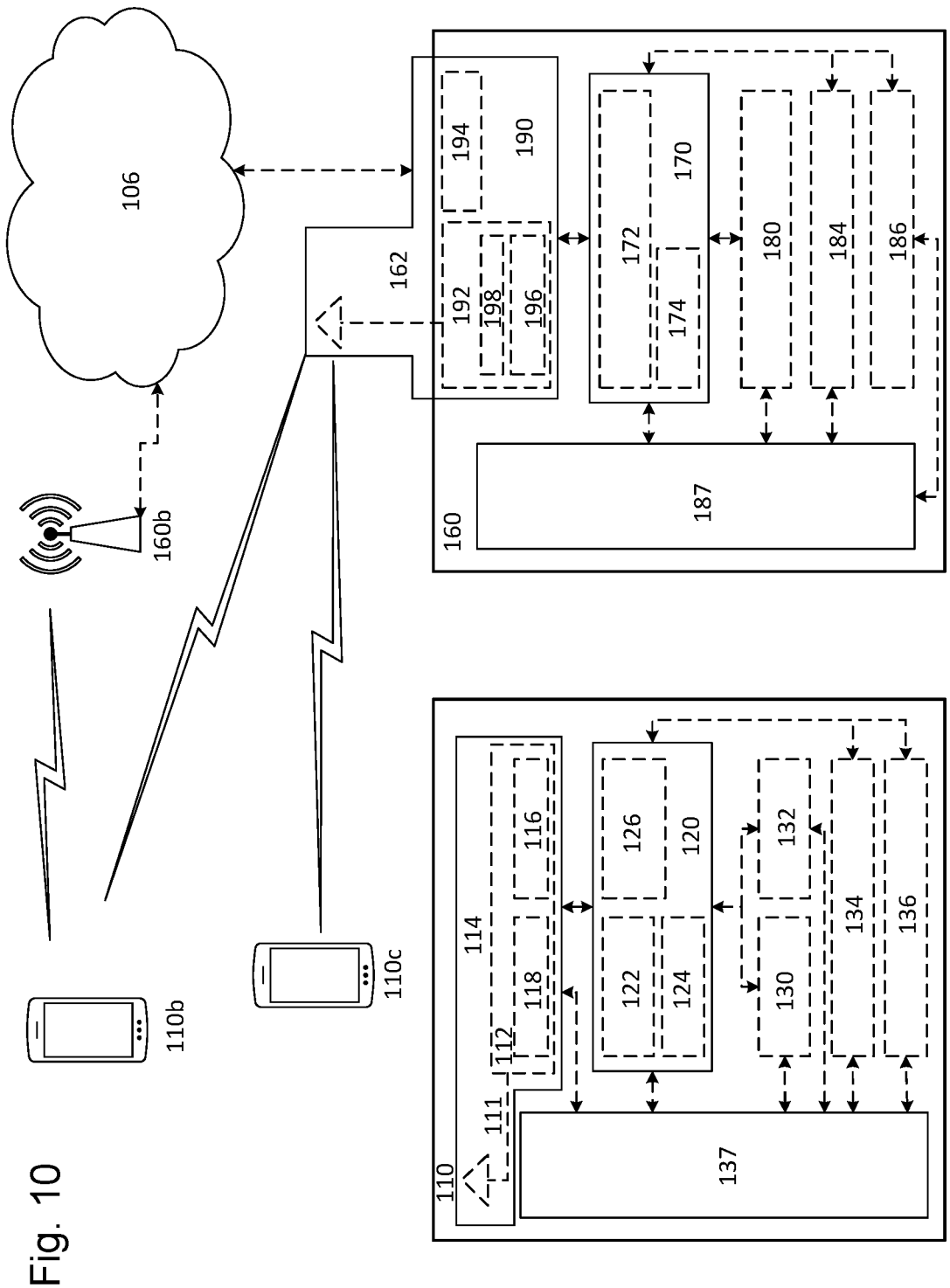
FIG. 10 is a block diagram illustrating an example wireless network.

FIG. 10 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 160 includes processing circuitry 170, device readable medium 180, interface 190, auxiliary equipment 184, power source 186, power circuitry 187, and antenna 162. Although network node 160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 10 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device.

Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 11:
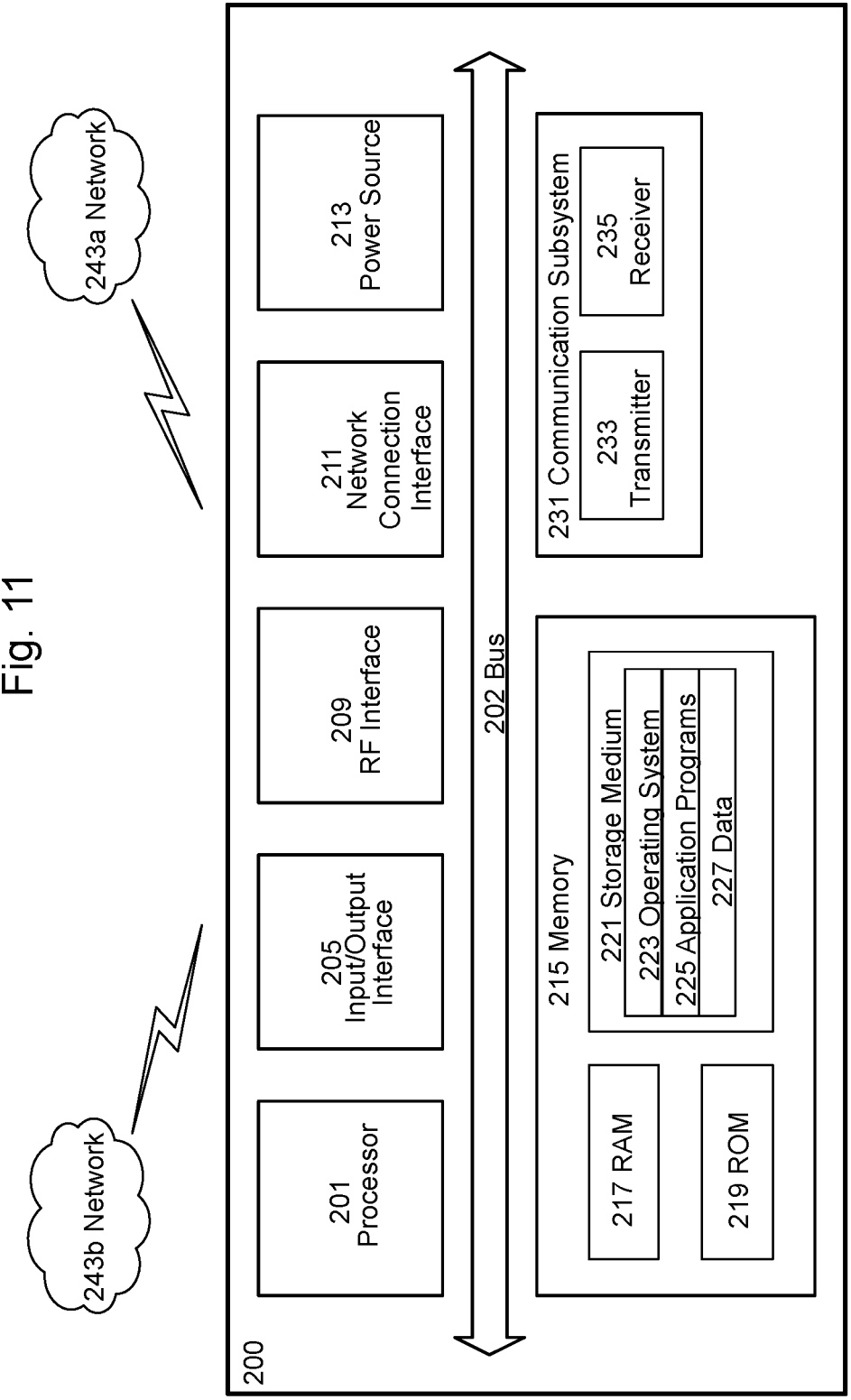
FIG. 11 illustrates an example user equipment, according to certain embodiments.

FIG. 11 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12:
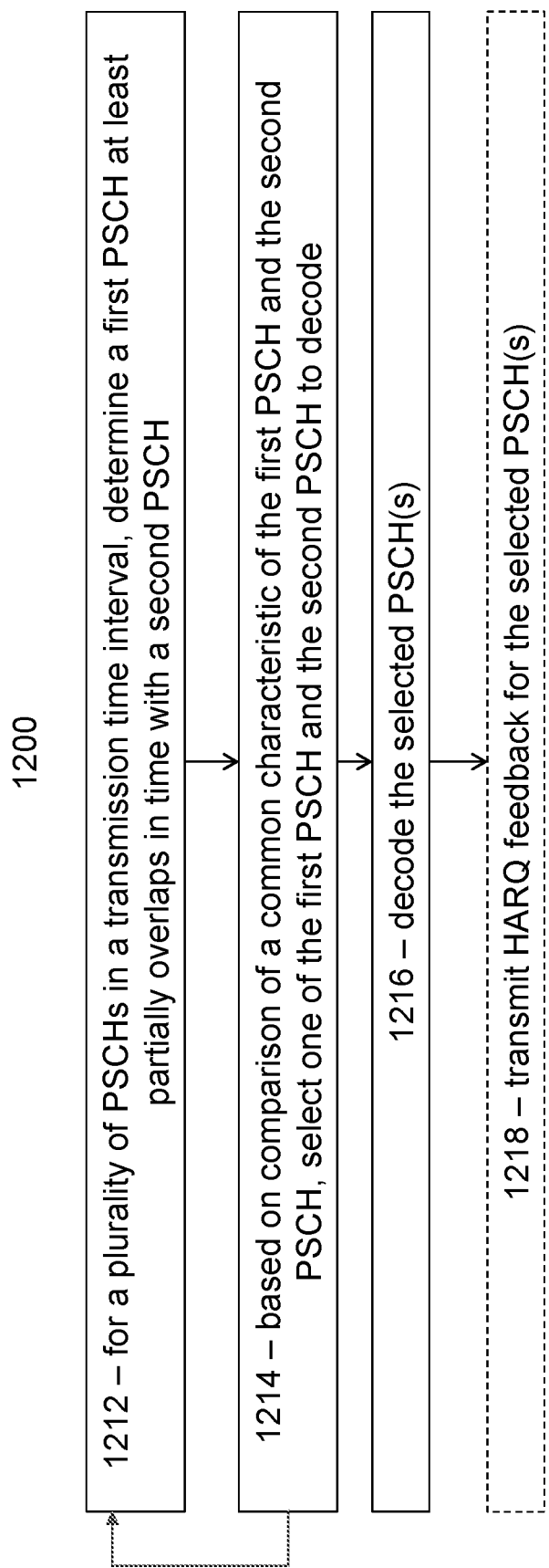
FIG. 12 is flowchart illustrating an example method in a wireless device, according to certain embodiments.

FIG. 12 is a flowchart illustrating an example method in a wireless device, according to certain embodiments. In particular embodiments, one or more steps of FIG. 12 may be performed by wireless device 110 described with respect to FIG. 10.

The method begins at step 1212, where the wireless device (e.g., wireless device 110), for a plurality of PSCHs in a transmission time interval, determines a first PSCH of the plurality of PSCHs at least partially overlaps in time with a second PSCH of the plurality of PSCHs. Examples of PSCH that overlap in time are described with respect to FIGS. 5-9.

At step 1214, based on a comparison of a common characteristic of the first PSCH and the second PSCH, the wireless device selects one of the first PSCH and the second PSCH to decode. The wireless device may use any of the criteria described in the embodiments and examples described herein.

In particular embodiments, the common characteristic comprises a configuration index of the PSCH and selecting one of the first and second PSCHs to decode comprises selecting the PSCH with a lower configuration index (or higher in some embodiments). The common characteristic may comprise a starting time of the PSCH and selecting one of the first and second PSCHs to decode comprises selecting the PSCH with an earliest starting time (or later in some embodiments). The common characteristic may comprise a priority of the PSCH and selecting one of the first and second PSCHs to decode comprises selecting the PSCH with a higher priority (or lower in some embodiments). For example, the priority may be based on a priority of a corresponding hybrid automatic repeat request (HARQ) acknowledgement (ACK) associated with the PSCH or a priority of a downlink control information (DCI) activating the PSCH.

In particular embodiments, the wireless device is capable of decoding N number of PSDCHs simultaneously and the method further comprises decoding any PSCH of the plurality of PSCHs that does not overlap in time with less than N other PSCH of the plurality of PSCHs. Examples are described with respect to FIGS. 8 and 9.

In some embodiments, steps 1212 and 1214 may be performed recursively or iteratively as described above until all collisions are resolved. In particular embodiments, the method comprises decoding any PSCH of the plurality of PSCHs that does not overlap in time with another PSCH of the plurality of PSCHs.

In particular embodiments, the plurality of PSCHs comprises more the one PSCH with the same configuration index and the more than one PSCHs with the same configuration index are all selected together. Examples are described with respect to FIGS. 6 and 7

In particular embodiments, the PSCHs comprise a mix of dynamic grant (DG) and semi-persistent scheduling (SPS) and selecting one of the first and second PSCHs to decode comprises selecting a DG PSCH over a SPS PSCH.

At step 1216, the wireless device decodes the selected PSCH(s). At step 1218, the wireless device may transmit HARQ feedback for the selected PSCH(s). The wireless device may not transmit HARQ feedback for the PSCH(s) that were not selected.

Modifications, additions, or omissions may be made to method 1200 of FIG. 12. Additionally, one or more steps in the method of FIG. 12 may be performed in parallel or in any suitable order.

Figure 13:
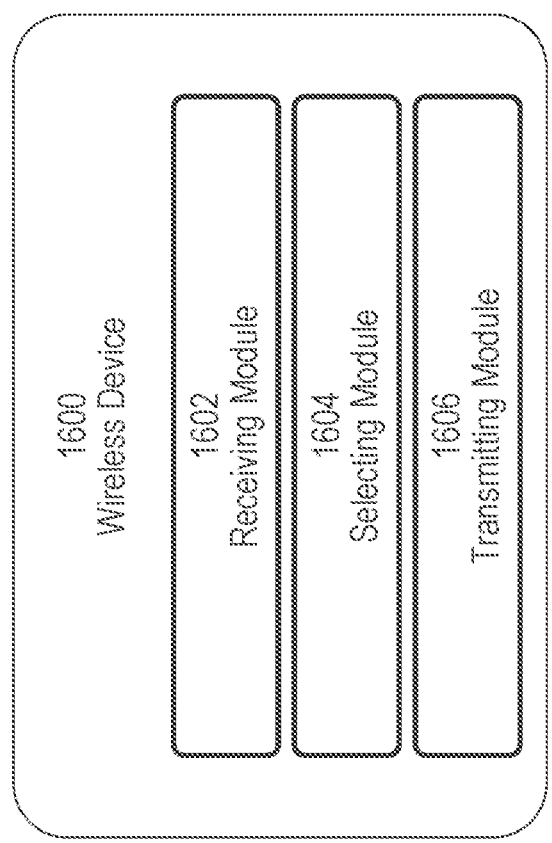
FIG. 13 illustrates a schematic block diagram of a wireless device in a wireless network, according to certain embodiments.

FIG. 13 illustrates a schematic block diagram of an apparatus in a wireless network (for example, the wireless network illustrated in FIG. 10). The apparatus may comprise a wireless device (e.g., wireless device 110 in FIG. 10). Apparatus 1600 is operable to carry out the example method described with reference to FIG. 12. Apparatus 1600 may be operable to carry out other processes or methods disclosed herein. It is also to be understood that the method of FIG. 12 is not necessarily carried out solely by apparatus 1600. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, selecting module 1604, transmitting module 1606, and any other suitable units of apparatus 1600 to perform corresponding functions according one or more embodiments of the present disclosure.

As illustrated in FIG. 13, apparatus 1600 includes receiving module 1602 configured to receive a plurality of PSCH during a transmission time interval from a network node according to any of the embodiments and examples described herein. Selecting module 1604 is configured to select PSCH to avoid collisions according to any of the embodiments and examples described herein. Apparatus 1600 also includes transmitting module 1606 configured to transmit HARQ feedback according to any of the embodiments and examples described herein.

Figure 14:
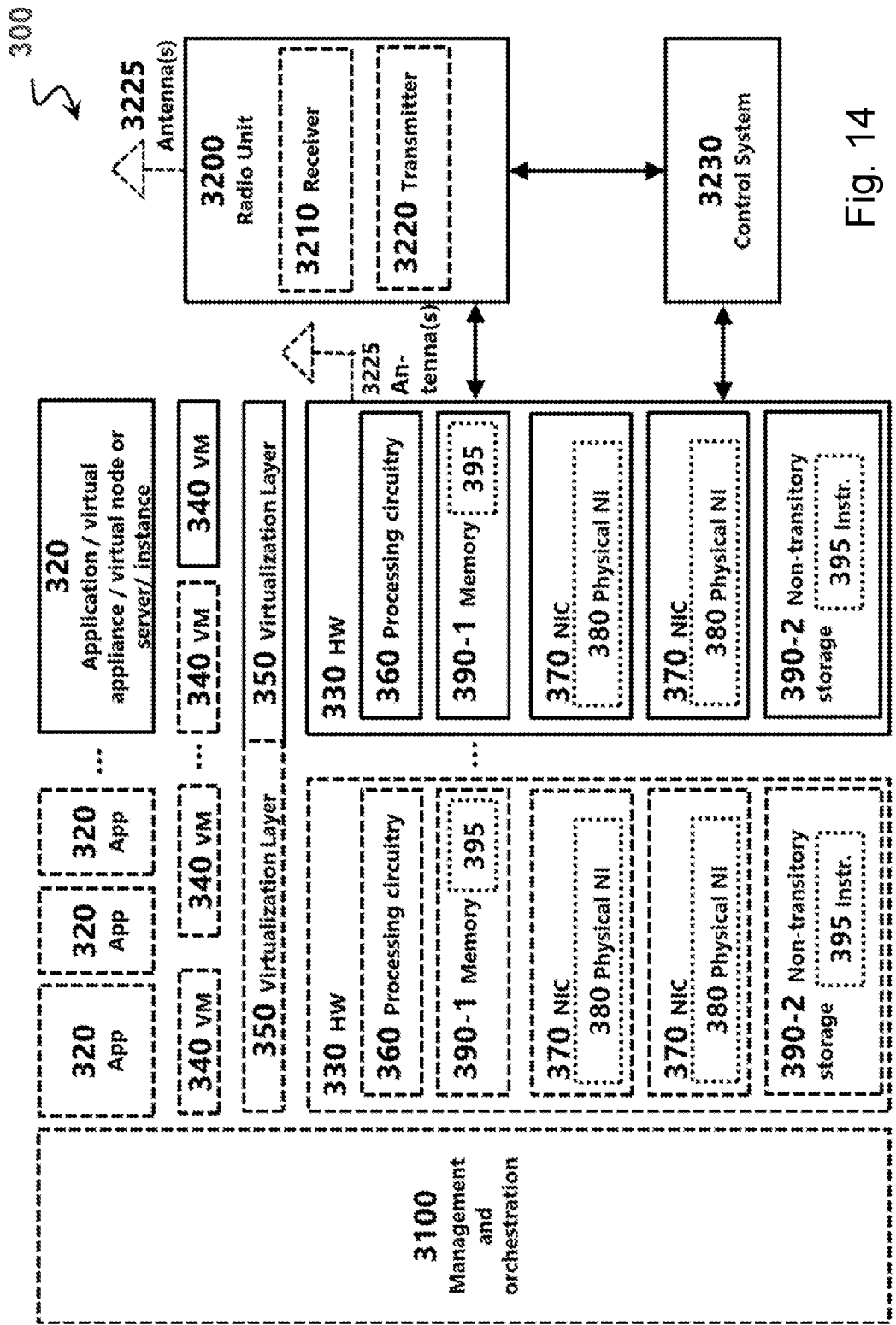
FIG. 14 illustrates an example virtualization environment, according to certain embodiments.

FIG. 14 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 14, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
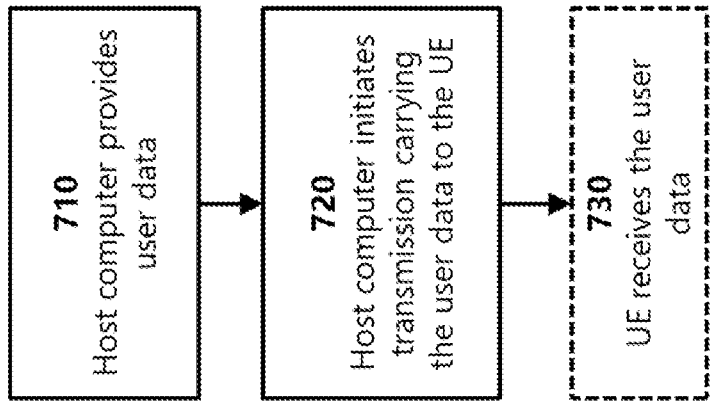
FIG. 18 is a flowchart illustrating a method implemented in a communication system, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 15:
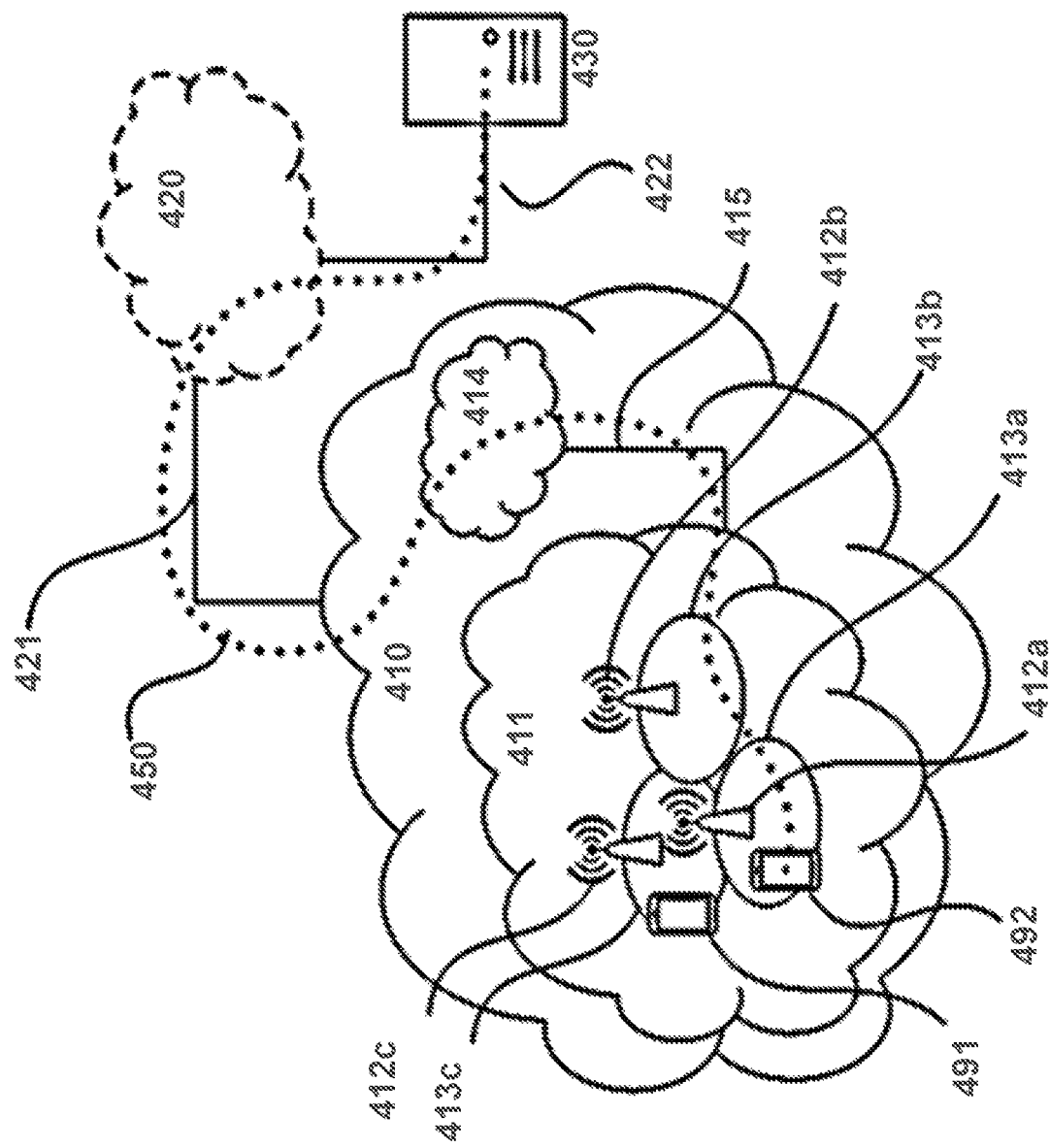
FIG. 15 illustrates an example telecommunication network connected via an intermediate network to a host computer, according to certain embodiments.

With reference to FIG. 15, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 16:
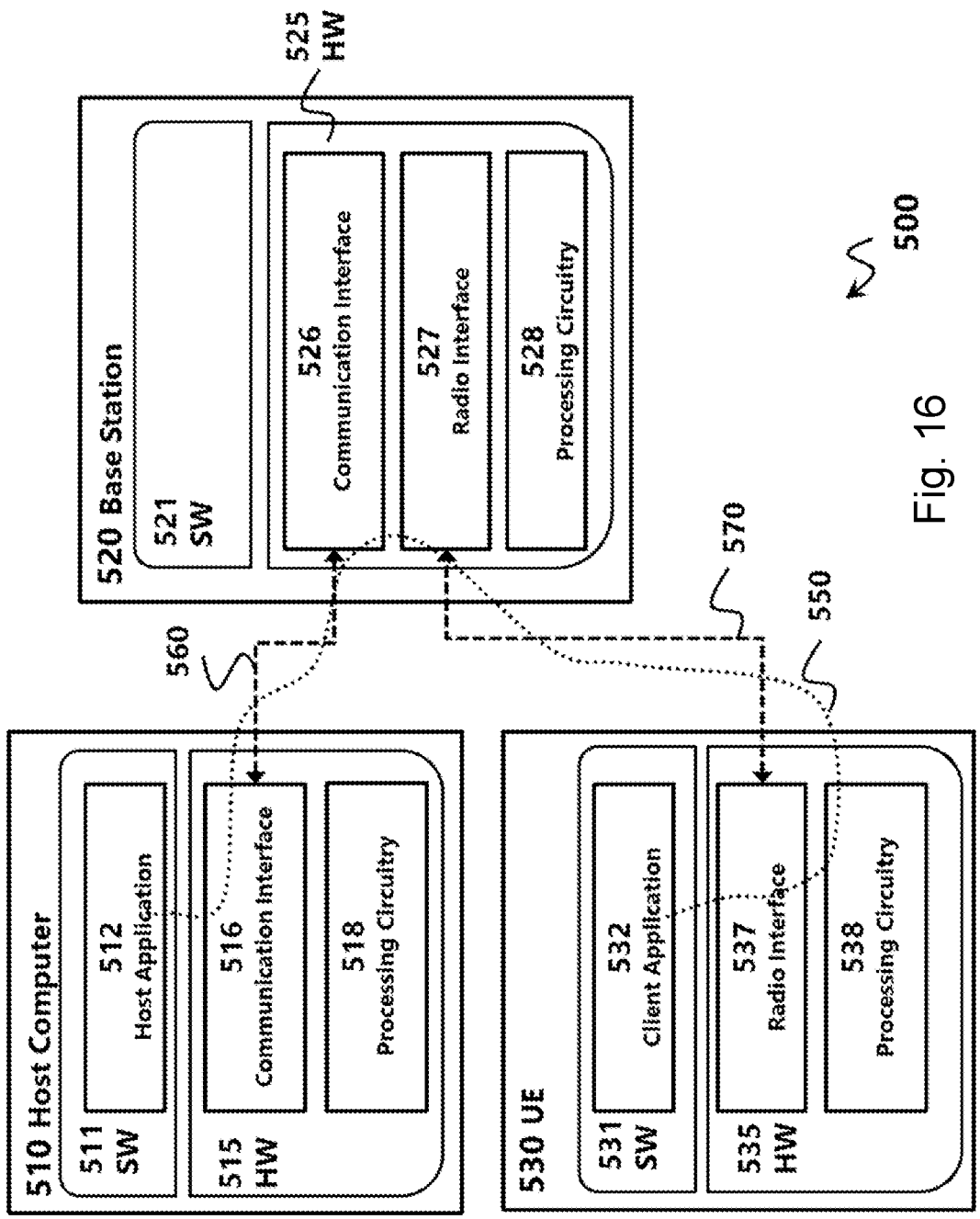
FIG. 16 illustrates an example host computer communicating via a base station with a user equipment over a partially wireless connection, according to certain embodiments.

FIG. 16 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by base station 520. Communication interface 526 may be configured to facilitate connection 560 to host computer 510. Connection 560 may be direct, or it may pass through a core network (not shown in FIG. 16) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 16 may be similar or identical to host computer 430, one of base stations 412a, 412b, 412c and one of UEs 491, 492 of FIG. 14, respectively. This is to say, the inner workings of these entities may be as shown in FIG. 16 and independently, the surrounding network topology may be that of FIG. 14.

In FIG. 16, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 17:
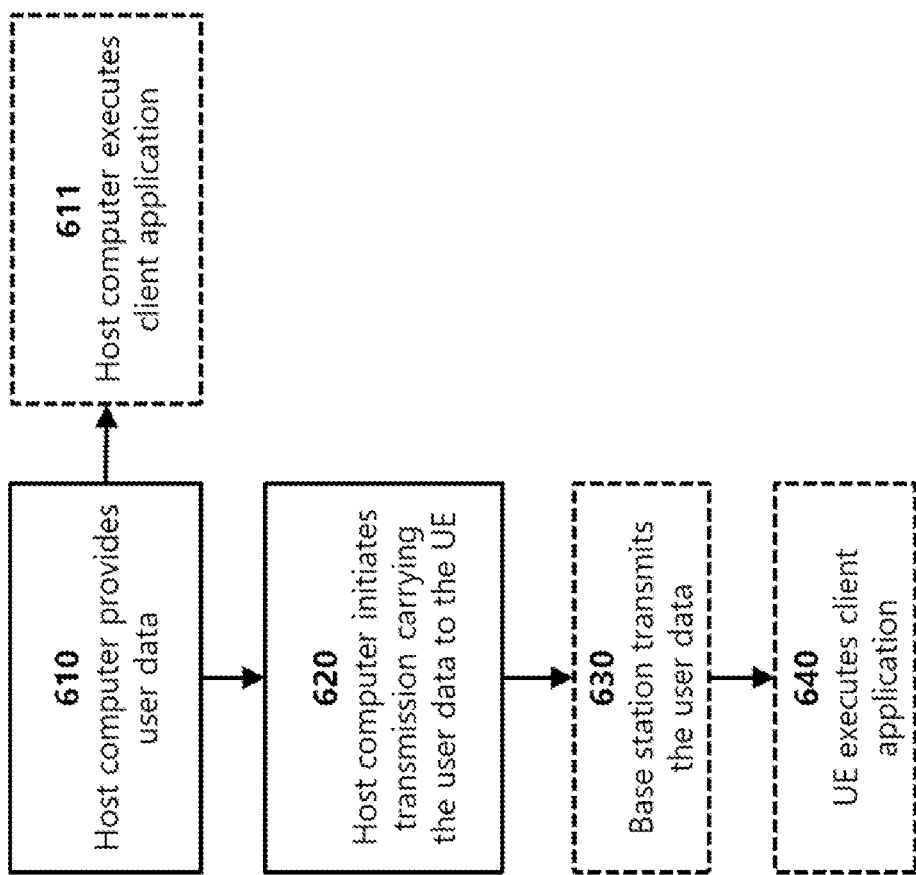
FIG. 17 is a flowchart illustrating a method implemented, according to certain embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 19:
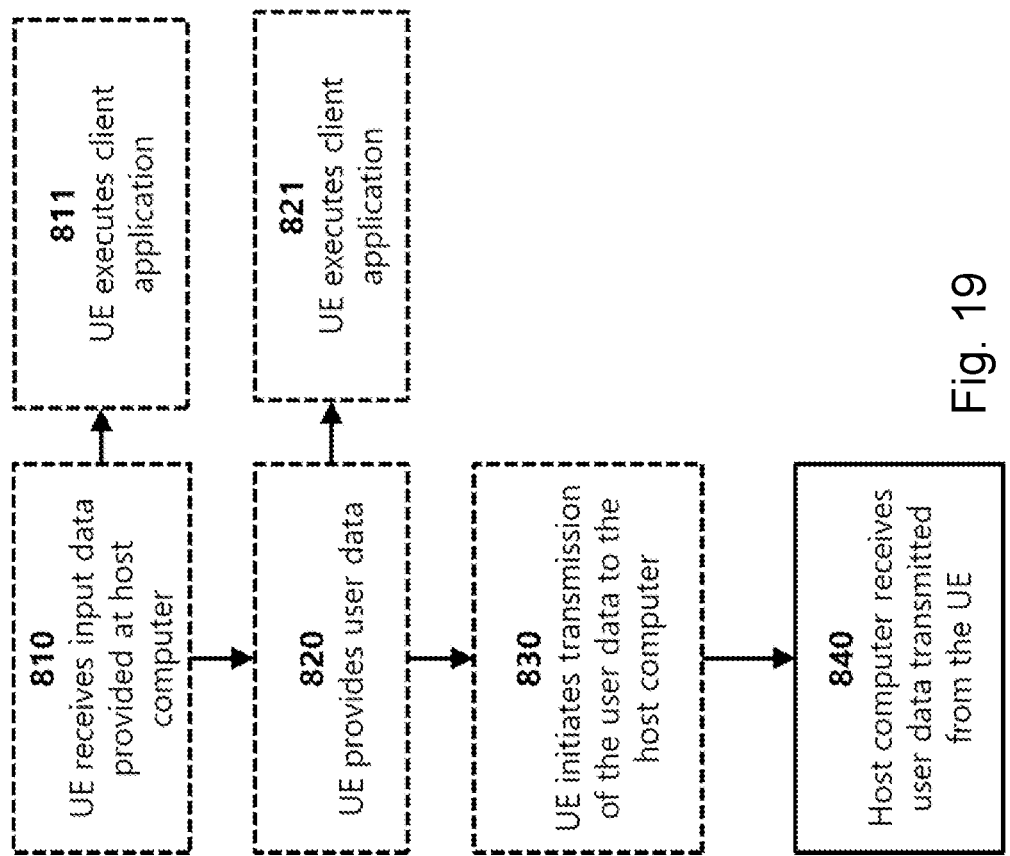
FIG. 19 is a flowchart illustrating a method implemented in a communication system, according to certain embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 20:
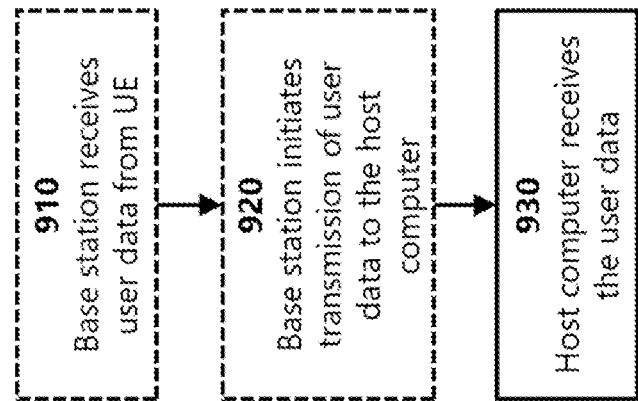
FIG. 20 is a flowchart illustrating a method implemented in a communication system, according to certain embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
CA Carrier Aggregation
CC Carrier Component
CDMA Code Division Multiplexing Access
CGI Cell Global Identifier
CQI Channel Quality information
C-RNTI Cell RNTI
CSI Channel State Information
DL Downlink
DM Demodulation
DMRS Demodulation Reference Signal
DRX Discontinuous Reception
DTX Discontinuous Transmission
eNB E-UTRAN NodeB
ePDCCH enhanced Physical Downlink Control Channel
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GPS Global Positioning System
GSM Global System for Mobile communication
HO Handover
HSPA High Speed Packet Access
HRPD High Rate Packet Data
LTE Long-Term Evolution
MAC Medium Access Control
MBMS Multimedia Broadcast Multicast Services
MBSFN Multimedia Broadcast multicast service Single Frequency Network
MIB Master Information Block
MIMO Multiple-Input Multiple-Output
MME Mobility Management Entity
MSC Mobile Switching Center
NGSO Non-Geostationary Orbit
NPDCCH Narrowband Physical Downlink Control Channel
NR New Radio
OFDM Orthogonal Frequency Division Multiplexing
OFDMA Orthogonal Frequency Division Multiple Access
OSS Operations Support System
O&M Operation and Maintenance
PCell Primary Cell
PDCCH Physical Downlink Control Channel
PDSCH Physical Downlink Shared Channel
PGW Packet Gateway
PLMN Public Land Mobile Network
PSS Primary Synchronization Signal
PUCCH Physical Uplink Control Channel
PUSCH Physical Uplink Shared Channel
RA Random Access
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSRP Reference Symbol Received Power OR Reference Signal Received Power
RSRQ Reference Signal Received Quality OR Reference Symbol Received Quality
RSSI Received Signal Strength Indicator
SCell Secondary Cell
SGW Serving Gateway
SI System Information
SIB System Information Block
SNR Signal to Noise Ratio
SRS Sounding Reference Signal
SS Synchronization Signal
SSS Secondary Synchronization Signal
TDD Time Division Duplex
TRP Transmit Reception Point
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for decoding physical shared channels (PSCHs), the method comprising:
   for a plurality of PSCHs in a transmission time interval, determining a first PSCH of the plurality of PSCHs at least partially overlaps in time with a second PSCH of the plurality of PSCHs;
   based on comparison of a common characteristic of the first PSCH and the second PSCH, selecting one of the first PSCH and the second PSCH to decode, wherein the plurality of PSCHs comprises more than one PSCH with the same configuration index and the more than one PSCHs with the same configuration index are all selected together; and
   decoding the selected PSCHs.

2. The method of claim 1, further comprising decoding any PSCH of the plurality of PSCHs that does not overlap in time with another PSCH of the plurality of PSCHs.

3. The method of claim 1, wherein the wireless device is capable of decoding N number of PSCHs simultaneously and the method further comprising decoding any PSCH of the plurality of PSCHs that does not overlap in time with less than N other PSCH of the plurality of PSCHs.

4. The method of claim 1, wherein the common characteristic comprises a configuration index of the PSCH and selecting one of the first and second PSCHs to decode comprises selecting the PSCH with a lower configuration index.

5. The method of claim 1, wherein the common characteristic comprises a starting time of the PSCH and selecting one of the first and second PSCHs to decode comprises selecting the PSCH with an earliest starting time.

6. The method of claim 1, wherein the common characteristic comprises a priority of the PSCH and selecting one of the first and second PSCHs to decode comprises selecting the PSCH with a higher priority.

7. The method of claim 6, wherein the priority is based on a priority of a corresponding hybrid automatic repeat request (HARQ) acknowledgement (ACK) associated with the PSCH.

8. The method of claim 6, wherein the priority is based on a priority of a downlink control information (DCI) activating the PSCH.

9. The method of claim 1, wherein the PSCHs comprise one of a physical downlink shared channel (PDSCH) and a physical uplink shared channel (PUSCH).

10. The method of claim 1, wherein the PSCHs comprise a mix of dynamic grant (DG) and semi-persistent scheduling (SPS) and selecting one of the first and second PSCHs to decode comprises selecting a DG PSCH over a SPS PSCH.

11. The method of claim 1, further comprising transmitting hybrid automatic repeat request (HARQ) feedback for the selected PSCH.

12. A wireless device capable of decoding physical shared channels (PSCHs), the wireless device comprising processing circuitry operable to:
for a plurality of PSCHs in a transmission time interval, determine a first PSCH of the plurality of PSCHs at least partially overlaps in time with a second PSCH of the plurality of PSCHs;
based on comparison of a common characteristic of the first PSCH and the second PSCH, select one of the first PSCH and the second PSCH to decode, wherein the plurality of PSCHs comprises more than one PSCH with the same configuration index and the more than one PSCHs with the same configuration index are all selected together; and
decode the selected PSCHs.

13. The wireless device of claim 12, the processing circuitry further operable to decode any PSCH of the plurality of PSCHs that does not overlap in time with another PSCH of the plurality of PSCHs.

14. The wireless device of claim 12, wherein the wireless device is capable of decoding N number of PSCHs simultaneously and the processing circuitry is further operable to decode any PSCH of the plurality of PSCHs that does not overlap in time with less than N other PSCH of the plurality of PSCHs.

15. The wireless device of claim 12, wherein the common characteristic comprises a configuration index of the PSCH and the processing circuitry is operable to select one of the first and second PSCHs to decode by selecting the PSCH with a lower configuration index.

16. The wireless device of claim 12, wherein the common characteristic comprises a starting time of the PSCH and the processing circuitry is operable to select one of the first and second PSCHs to decode by selecting the PSCH with an earliest starting time.

17. The wireless device of claim 12, wherein the common characteristic comprises a priority of the PSCH and the processing circuitry is operable to select one of the first and second PSCHs to decode by selecting the PSCH with a higher priority.

18. The wireless device of claim 17, wherein the priority is based on a priority of a corresponding hybrid automatic repeat request (HARQ) acknowledgement (ACK) associated with the PSCH.

19. The wireless device of claim 17, wherein the priority is based on a priority of a downlink control information (DCI) activating the PSCH.

20. The wireless device of claim 12, wherein the PSCHs comprise one of a physical downlink shared channel (PDSCH) and a physical uplink shared channel (PUSCH).

21. The wireless device of claim 12, wherein the PSCHs comprise a mix of dynamic grant (DG) and semi-persistent scheduling (SPS) and selecting one of the first and second PSCHs to decode comprises selecting a DG PSCH over a SPS PSCH.

22. The wireless device of claim 12, the processing circuitry further operable to transmit hybrid automatic repeat request (HARQ) feedback for the selected PSCH.

* * * * *

UNITED STATES PATENT AND TRADEMARK OFFICE
CERTIFICATE OF CORRECTION

PATENT NO. : 12,279,301 B2
APPLICATION NO. : 17/781771
DATED : April 15, 2025
INVENTOR(S) : Andersson et al.

Page 1 of 2

It is certified that error appears in the above-identified patent and that said Letters Patent is hereby corrected as shown below:

In the Specification

In Column 1, Lines 63-64, delete "physical downlink data channel (PDSCH) or physical uplink data channel (PUSCH)." and insert -- physical downlink shared channel (PDSCH) or physical uplink shared channel (PUSCH). --, therefor.

In Column 4, Line 56, delete "start and length indicator (SLIV)." and insert -- start and length indicator value (SLIV). --, therefor, In Column 5, Line 27, delete "PSDCH" and insert -- PDSCH --, therefor.

In Column 7, Line 43, delete "PSDCHs" and insert -- PSCHs --, therefor.

In Column 10, Line 35, delete "identity the" and insert -- identify the --, therefor.

In Column 11, Line 10, delete "SPS PDCSHs" and insert -- SPS PDSCHs --, therefor.

In Column 11, Line 11, delete "PDCSHs" and insert -- PDSCHs --, therefor.

In Column 11, Line 32, delete "identity the" and insert -- identify the --, therefor.

In Column 11, Line 45, delete "identity the" and insert -- identify the --, therefor.

In Column 12, Line 21, delete "identity the" and insert -- identify the --, therefor.

In Column 12, Line 25, delete "identity the" and insert -- identify the --, therefor.

In Column 13, Line 57, delete "SPS PDCSHs" and insert -- SPS PDSCHs --, therefor.

Signed and Sealed this
Thirtieth Day of December, 2025

John A. Squires
*Director of the United States Patent and Trademark Office*

CERTIFICATE OF CORRECTION (continued)
U.S. Pat. No. 12,279,301 B2

In Column 13, Line 59, delete "SPS PDCSHs" and insert -- SPS PDSCHs --, therefor.

In Column 13, Line 63, delete "PDCSHs" and insert -- PDSCHs --, therefor.

In Column 13, Line 66, delete "PDCSHs" and insert -- PDSCHs --, therefor.

In Column 29, Line 46, delete "PSDCHs" and insert -- PSCHs --, therefor.

In Column 37, Line 12, delete "CDMA Code Division Multiplexing Access" and insert -- CDMA Code Division Multiple Access --, therefor.

In Column 37, Line 13, delete "CGI Cell Global Identifier" and insert -- CGI Cell Global Identity --, therefor.

In Column 37, Line 14, delete "CQI Channel Quality information" and insert -- CQI Channel Quality Indicator --, therefor.

In Column 37, Line 55, delete "PGW Packet Gateway" and insert -- PGW Packet Data Network Gateway --, therefor.

In Column 37, Line 65, delete "RLM Radio Link Management" and insert -- RLM Radio Link Monitoring --, therefor.

In Column 38, Line 28, delete "WCDMA Wide CDMA" and insert -- WCDMA Wideband CDMA --, therefor.

In Column 38, Line 29, delete "WLAN Wide Local Area Network" and insert -- WLAN Wireless Local Area Network --, therefor.